United States Patent [19]

Aoyagi et al.

[11] Patent Number: 4,613,975
[45] Date of Patent: Sep. 23, 1986

[54] SELECTIVE FADING PROTECTION SYSTEM

[75] Inventors: Hidehito Aoyagi; Botaro Hirosaki, both of Tokyo, Japan

[73] Assignee: NEC Corporation, Tokyo, Japan

[21] Appl. No.: 643,857

[22] Filed: Aug. 24, 1984

[30] Foreign Application Priority Data

Aug. 26, 1983 [JP] Japan ................................. 58-156099

[51] Int. Cl.⁴ ......................... H04L 1/06; H04B 7/08; H04B 3/04
[52] U.S. Cl. ....................................... 375/40; 375/14; 375/100; 375/102; 333/18
[58] Field of Search ..................... 375/12, 13, 14, 15, 375/39, 40, 100, 102; 333/18; 364/724, 825; 455/134, 136

[56] References Cited

U.S. PATENT DOCUMENTS

| | | | |
|---|---|---|---|
| 3,633,107 | 1/1972 | Brady | 375/40 |
| 4,394,768 | 7/1983 | Sari | 375/14 |
| 4,408,332 | 10/1983 | Sari | 375/14 |
| 4,467,441 | 8/1984 | Gritton | 375/14 |

OTHER PUBLICATIONS

"An Analysis of Automatic Equalizers for Orthogonally Multiplexed QAM Systems", Botaro Hirosaki, IEEE Transactions, vol. Com-28, No. 1, Jan. 1980, pp. 73-83.
"A Highly Efficient HF Modem with Adaptive Fading Control Algorithm", Botaro Hirosaki and Hidehito Aoyagi, Globecom '84, Nov. 29, 1984.

Primary Examiner—Benedict V. Safourek
Assistant Examiner—Raymond C. Glenny
Attorney, Agent, or Firm—Schwartz, Jeffery, Schwaab, Mack, Blumenthal & Evans

[57] ABSTRACT

The fading protection system protects against fading selectively occuring in a specific channel of a plural data transmission system. An equalizer is provided in each channel and adapted to equalize received data. An error correction mechanism is also provided for correcting errors of the received data in at least any one channel. A comparator associated with each channel is provided to deliver a first signal when the level of the received data in the associated channel has been reduced below a predetermined first threshold to indicate a level reduced channel. A controller operates in response to the first signal so as to deliver, as reference data, the correct data, after correction by the error correcting mechanism, to the equalizer provided in the level reduced channel. The controller also effects the supervised learning operation for correcting a coefficient of the equalizer in the level reduced channel so as to reduce the difference between the reference data and the output from the equalizer in the level reduced channel.

18 Claims, 9 Drawing Figures

SELECTIVE FADING PROTECTION SYSTEM

BACKGROUND OF THE INVENTION

The present invention relates to a data transmission system having a plurality of parallel channels. More particularly, the invention is concerned with a selective fading protection system for maintaining stable operation of an automatic equalizer provided in a receiving system.

Parallel channel data transmission systems are widely used because of their high efficiency of data transmission and high selective fading characteristics. Since, in the usual case, a reduction of power due to fading takes place in only one or two channels, correction data from a preselected channel reserved for error correction can be used in place of the data from the power-failed channel thereby easily correcting the data. However, the automatic equalizer provided in the powerfailed channel operates out of control because it does not receive an input signal of sufficient strength to be effective for stable operation thereof, due to extreme deterioration of the S/N of the input signal. In consequence, the automatic equalizer cannot recover to a desired stable state even when the effective signal is received again after a relaxation of the selective fading, so that the equalizer remains in the unstable state or becomes stabilized at a different stable point, making it impossible to correct received data.

SUMMARY OF THE INVENTION

Accordingly, an object of the invention is to provide a selective fading protection system capable of maintaining the automatic equalizer in a stable state regardless of the strength of the selective fading.

Another object of the invention is to provide a system which can eliminate the influence of the selective fading.

According to an aspect of the invention, there is provided a selective fading protection system for protecting fading selectively occurring in a specific channel of a parallel data transmission system, the system comprising: an equalizer provided in each channel and adapted for equalizing received data; an error correcting means for correcting error of received data in at least one channel; a comparator corresponding to each channel and adapted to deliver a first signal when the level of the received data in a channel has come down below a predetermined first threshold level; and a controller adapted to operate in response to the first signal so as to deliver, as reference data, the correct data after correction by the error correcting means to the equalizer of a channel having the comparator from which the first signal has been outputted, and to effect a supervised-learning operation for correcting the coefficient of the equalizer so as to reduce the difference between the reference data and the output from the equalizer.

According to one feature of the invention, the comparator is further provided with a circuit which is adapted to produce a second signal when the level of the received data is lower than a second threshold level lower than the first threshold level, while the controller is provided with a function to set the coefficients of the equalizer at a predetermined value, e.g., zero, in response to the second signal. With this arrangement, it is possible to obtain a higher stability of operation of the equalizer.

These and other objects, features and advantages of the invention will become clear from the following description of the preferred embodiments taken in conjunction with the accompanying drawings.

DETAILED DESCRIPTION OF THE PREFERRED EMBODIMENTS

The invention is applicable to any transmission system, provided that the system is a parallel data transmission system. Embodiments described hereinunder are applied to an orthogonal multi-parallel data transmission system (referred to as a "QAM system") which exhibits superior transmission efficiency.

It is known that the orthogonally multiplexed QAM system permits highly efficient data transmission well approximating the ideal Nyquist transmission, by employing a plurality of parallel channels with allowable spectrum overlap in a predetermined band. The details of an orthogonally multiplexed QAM system and the automatic equalizer in that system are shown in an article "AN ANALYSIS OF AUTOMATIC EQUALIZERS FOR ORTHOGONALLY MULTIPLEXED QAM SYSTEMS" written by Botaro Hirosaki, IEEE TRANSACTIONS ON COMMUNICATIONS, Vol. COM-28, NO. 1, JANUARY 1980, pp. 73 to 83. Although various error correction systems are available, the following embodiments employ an even-number parity system by way of example.

Figure 1:
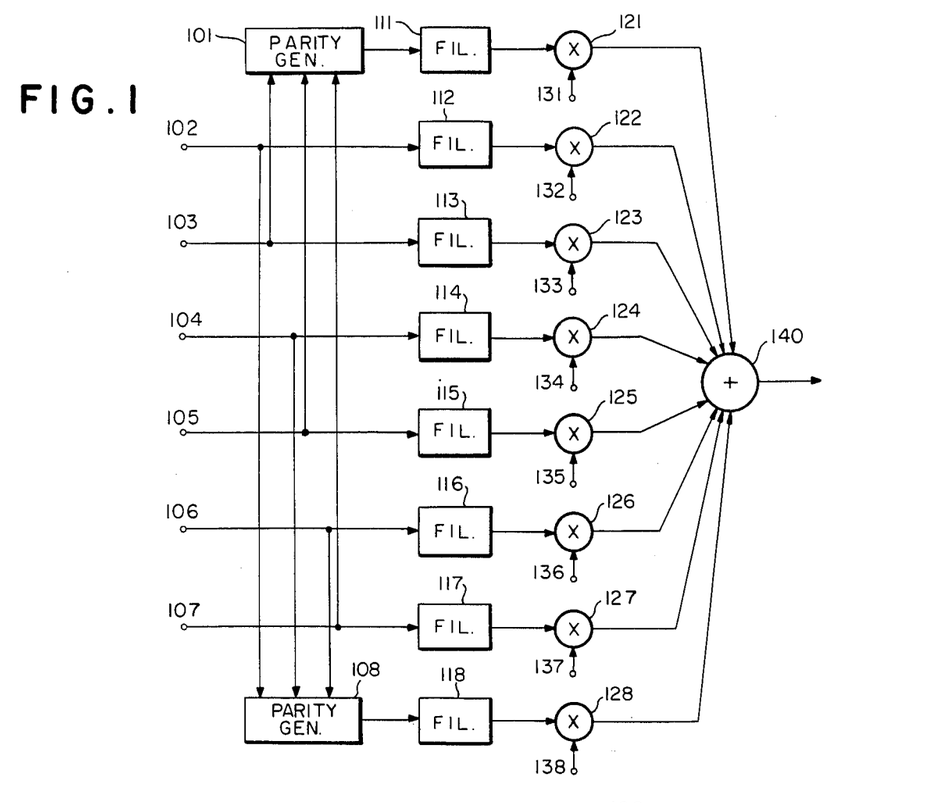
FIG. 1 is a block diagram of a transmission device in an orthogonally multiplexed QAM transmission system, explanatory of an embodiment of the invention.

FIG. 1 is a block diagram showing the basic construction of a transmission device used in an 8-channel orthogonally multiplexed QAM transmission system which is a kind of orthogonal multiplexing data transmission system. Referring to this Figure, reference numerals 102 to 107 denote input terminals for receiving the second to the seventh complex data. The k-th serial complex data $S_k(t)$ is expressed as follows, when the number k is an even number, by making use of the real part data $\{a_{k,l}\}_l^\infty = -\infty$ and imaginary part data $\{b_{k,l}\}_l^\infty = -$.

$$S_k(t) = \sum_{l=\infty}^{\infty} a_{k,l}\delta(t - lT) + j\sum_{l=-\infty}^{\infty} b_{k,l}\delta\left(t - \frac{T}{2} - lT\right)$$

To the contrary, when the number k is an odd number, the same is expressed as follows $$S_k(t) = \sum_{l=-\infty}^{\infty} a_{k,l}\delta\left(t - \frac{T}{2} - lT\right) + j\sum_{l=-\infty}^{\infty} b_{k,l}\delta(t - lT)$$

In these formulae, δ(t) represents an ideal impulse response, while T represents the symbol clock period of each of the parallel channels. The time interval of T/2 between the real part data and the imaginary part data, as well as the twisting of the delay relation between an even-number channel and the odd-number channel, ensures time-orthogonality between the parallel channels.

Figure 2:
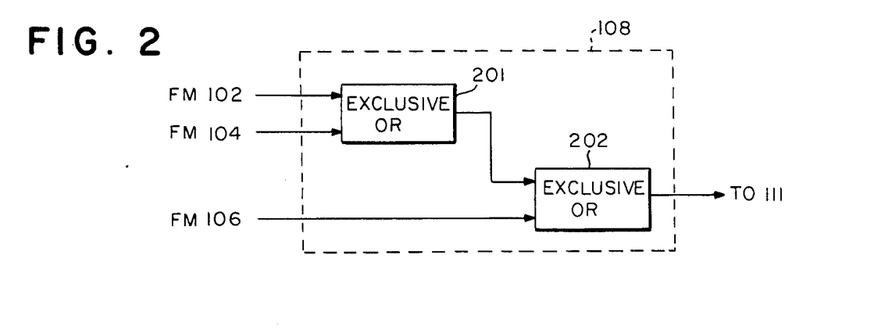
FIG. 2 is a block diagram of the construction of an even-number parity generating circuit for a transmitter in the device as shown in FIG. 1.

In this embodiment, the input data $a_{k,l}$ and $b_{k,l}$ are treated as a binary signal of ±1. Numerals 101 and 108 denote, respectively, even-number parity generating circuits at the transmission side adapted to receive the input data from even-number channels and input data from odd-number channels. Both circuits have a similar construction as shown in FIG. 2 representative of the circuit 108. This circuit is composed of two exclusive OR circuits 201, 202. It is assumed here that the even-number parity generating circuits 101, 108 at the transmission side handle the +1 input or output signal as a logical "1" and the −1 input or output as logical "0". In the arrangement shown in FIG. 1, the even-number parity generating circuits are divided into a part for even-number channels and a part for odd-number channels, in order to guard against a possible simultaneous power failure in two adjacent channels. The outputs from the even-number parity generating circuits 101 and 108 constitute the first and the eighth serial complex data. Numerals 111 to 118 are baseband filters for effecting baseband wave shaping for the first to the eighth serial data, respectively. These baseband filters have a frequency transmission characteristic G (ω) which is generally referred to as the root Nyquist characteristic, i.e., the characteristic that the Nyquist condition is met by $G^2(\omega)$.

By representing the time response of G (ω) by g(t) the output $x_k(t)$ from the k-th baseband filter is given as follows:

$$x_k(t) = \begin{cases} \sum_{l=-\infty}^{\infty} a_{k,l}g(t - lT) + \sum_{l=-\infty}^{\infty} b_{k,l}g\left(t - \frac{T}{2} - lT\right) \\ \text{(This formula applies when } k \text{ is an even number)} \\ \sum_{l=-\infty}^{\infty} a_{k,l}g\left(t - \frac{T}{2} - lT\right) + j\sum_{l=-\infty}^{\infty} b_{k,l}g(t - lT) \\ \text{(This formula applies when } k \text{ is an odd number)} \end{cases}$$

Figure 3:
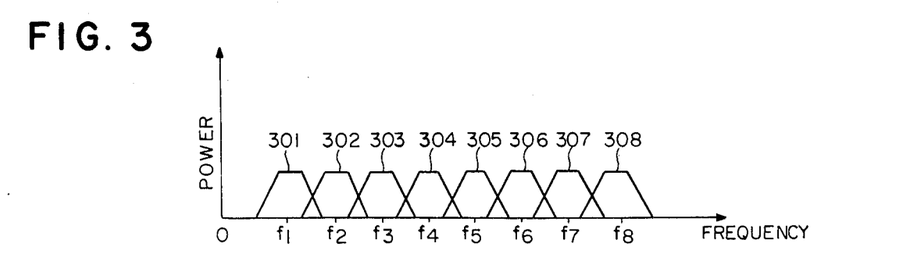
FIG. 3 is a spectrum diagram of a transmitted orthogonally multiplexed QAM signal.

Numerals 121 to 128 represent modulators adapted to modulate the outputs from corresponding baseband filters by means of complex carriers from respective terminals 131 to 138. Representing the frequency of the k-th complex carrier by $f_k$, the differential between adjacent carriers, i.e., $f_k - f_{k-1}$ is selected to be equal to the baud frequency given as 1/T. A reference numeral 140 designates an adder circuit which determines the sum of the modulated output, which is given by the following formula.

$$y(t) = \sum_{k=1}^{8} Re\{X_k(t) \cdot e^{-j2\pi f_k t}\}$$

where, Re {.} represents the extraction operation of the complexed data in the parenthesis. The term Re {$X_k(t)$ $e^{-j2\pi f_k t}$} repesents the k-th QAM signal, i.e. quadrature amplitude modulation signal. As shown in FIG. 3 by numerals 301 to 308, the spectrum of the transmitted signals y(t) are arranged such that the first to the eighth QAM signals are arranged in a side-by-side manner allowing partial spectrum overlap.

Figure 4:
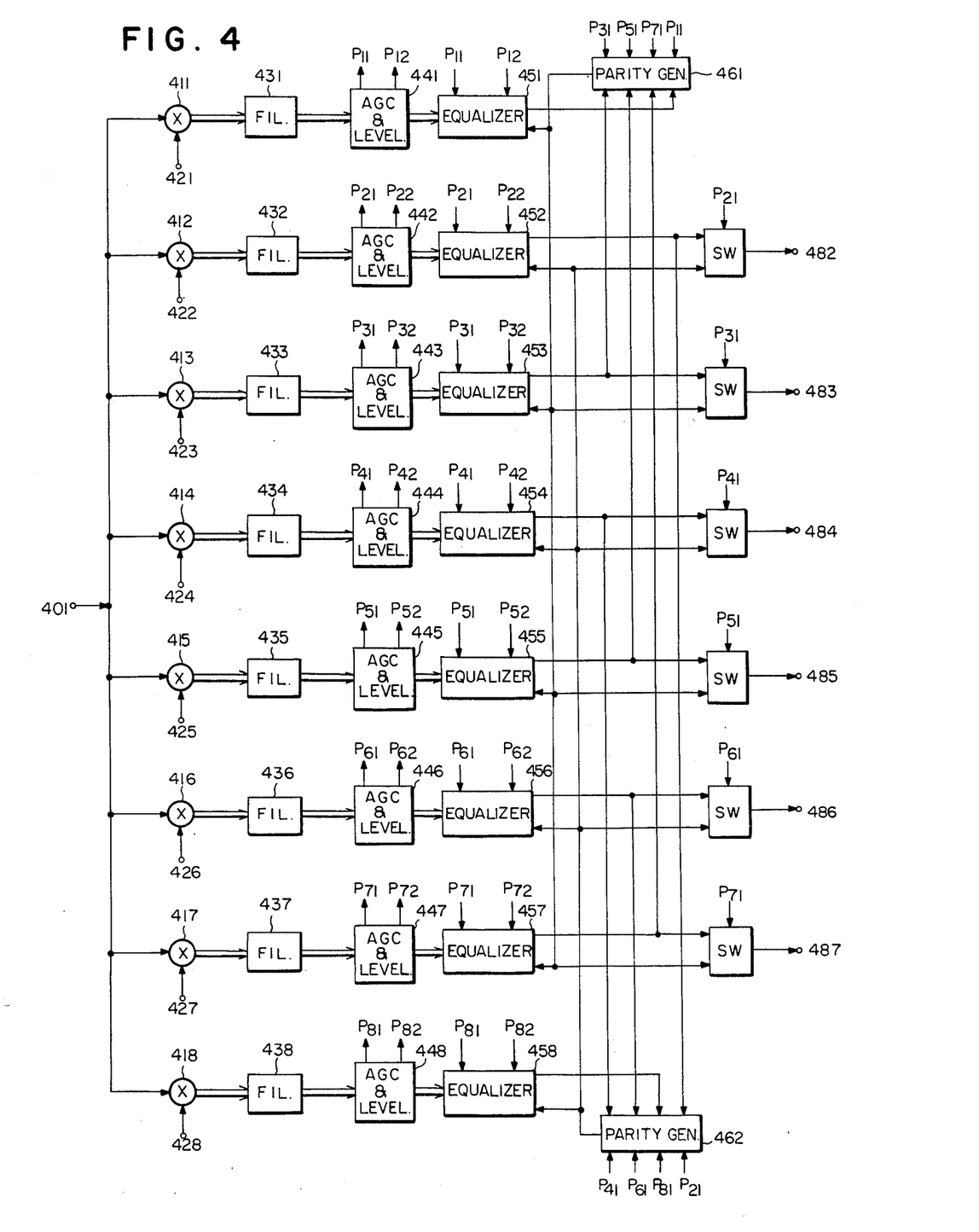
FIG. 4 is a block diagram of a receiving device of the orthogonally multiplexed QAM transmission system.

FIG. 4 is a block diagram of a receiving device in an orthogonally multiplexed QAM transmission system. In this Figure, double-lines are used to represent complex signal lines. The signal is received through an input terminal 401 and delivered to demodulators 411 to 418. The demodulators 411 to 418 demodulate the signal into respective baseband signals by making use of the complex carriers from the terminals 421 to 428. The k-th complex carrier is expressed by $e^{j2\pi f_k t}$, in which numerals 431 to 438 repesent baseband filters having the same characteristics as those used in the transmission device. A function obtained through convolutional integration of g(t) and g(t) is expressed here by f(t). When there is no distortion in the transmission path, the k-th baseband filter output $Z_k(t)$ is expressed as follows:

$$Z_k(t) = \begin{cases} \sum_{l=-\infty}^{\infty} a_{k,l}f(t - lT) + j\sum_{l=-\infty}^{\infty} b_{k,l}f\left(t - \frac{T}{2} - lT\right) \\ \sum_{l=-\infty}^{\infty} a_{k,l}f\left(t - \frac{T}{2} - lT\right) + j\sum_{l=-\infty}^{\infty} b_{k,l}f(t - lT) \end{cases}$$

Numerals 441 to 448 represent automatic-gain-control amplifying and level discriminating devices, adapted to effect a correction of $Z_k(t)$, which is affected by the selective fading, to make the automatic-gain-control amplifier operate in a stable state. The construction of the automatic-gain-control amplifying and level discriminating device, generally designated at the numeral 441, is shown in FIG. 5 by way of example.

Figure 5:
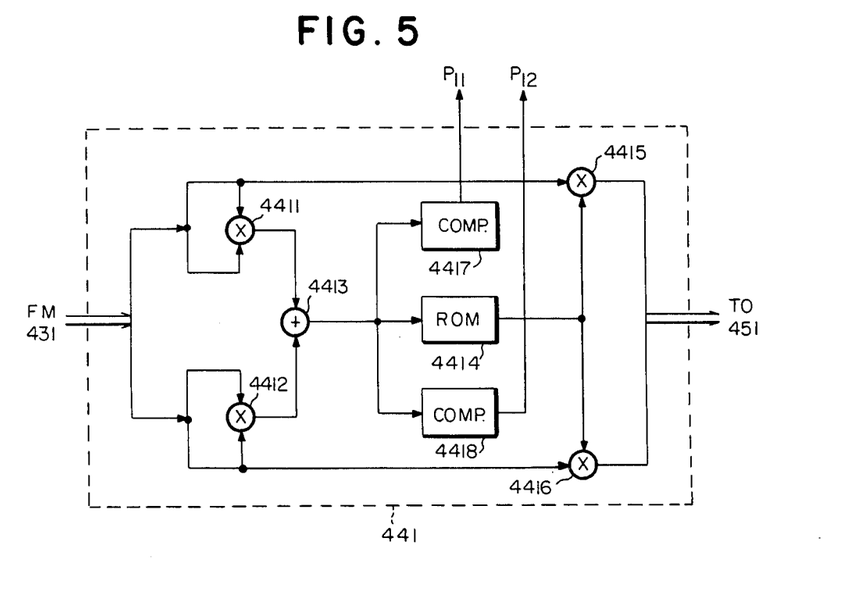
FIG. 5 is a block diagram of an automatic gain control amplifying and level discriminating device in the arrangement shown in FIG. 4.

Referring to FIG. 5, the real part and the imaginary part of the baseband signal from the baseband filter 431 are processed by respective multipliers 4411 and 4412 and the results are added by an adder 4413. Thus, the output from the adder 4413 constitutes the output power of this channel. A read only memory (ROM) 4414 stores therein an amplification factor corresponding to the power of the above-mentioned channel. Thus, the real part and the imaginary part of the baseband signal are multiplied in the multipliers 4415 and 4416 by the amplification factor read out from the read only memory 4414, so that a signal of a constant power is obtained. Numerals 4417 and 4418 are discriminators. In the case where there is no selective fading, the discrimination outputs are zero. However, when there is selective fading to decrease the power of the channel below a predetermined first threshold level, the discriminator 4417 produces an output $P_{11}$ of "1". When the power of the channel has come down below a predetermined second threshold level due to the strengthening of the selective fading, the output $P_{12}$ from the discriminator 4418 takes the "1" level. Symbols $P_{k1}$ and $P_{k2}$ are used here to mean the outputs from discriminators provided for the k-th channel the, same as the discriminators 4417 and 4418.

Referring again to FIG. 4, the outputs from the automatic-gain-control (AGC) amplifying and level discriminating devices 441–448 of respective channels are delivered to respective automatic equalizers 451 to 458, so that the interference between channels and interference between symbols are equalized to allow the recovery of complex data of respective channels.

Figure 6:
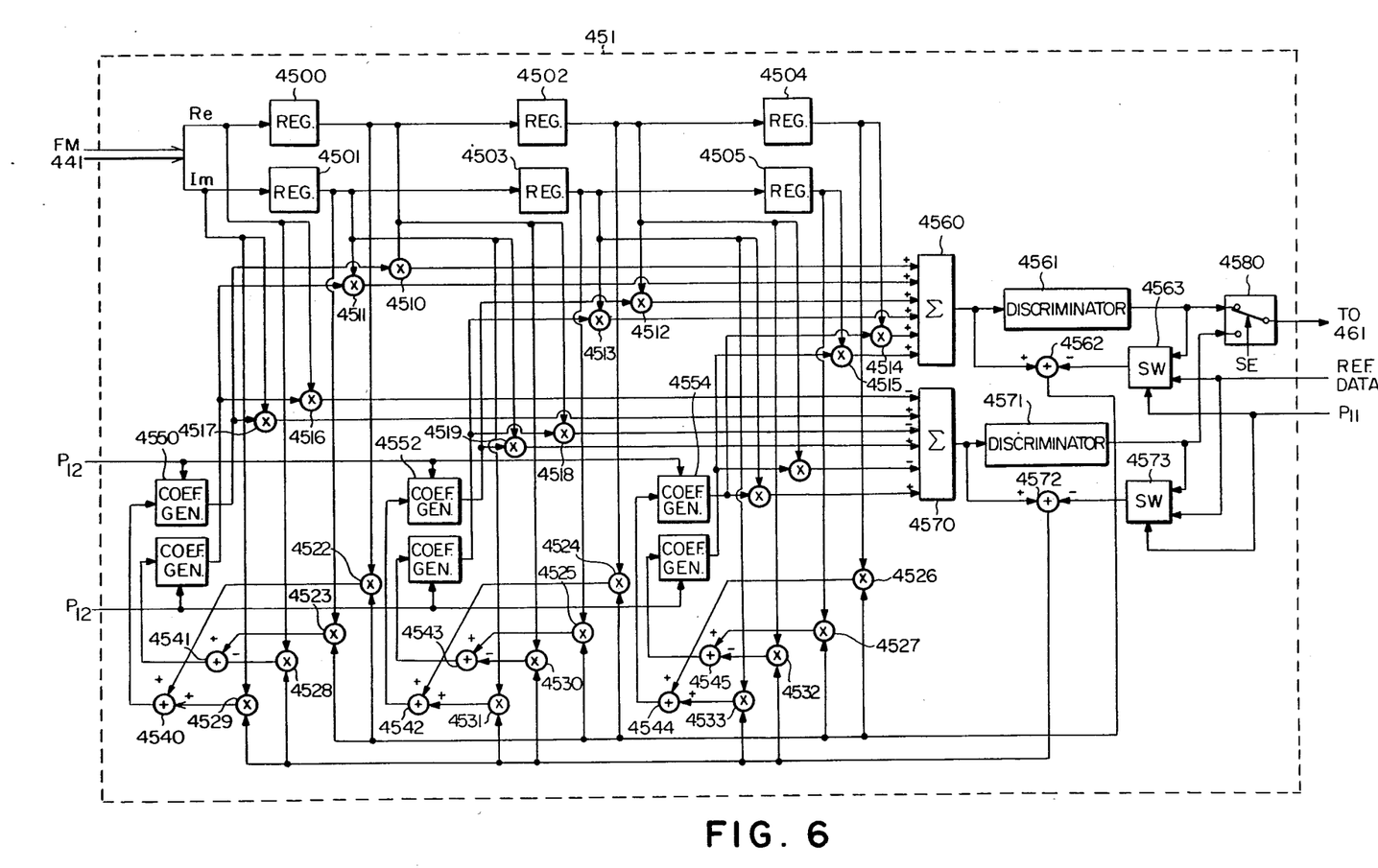
FIG. 6 shows a basic arrangement of an automatic equalizer in the system shown in FIG. 4.

The automatic equalizer 451 is exemplarily shown in detail in FIG. 6.

The input complex signal is sampled each T/2 second by means of a sampler which is not shown, and the real parts of the samples are successively inputted to registers 4500, 4502 and 4504. Similarly, the imaginary parts are successively inputted to registers 4501, 4503 and 4505. The outputs from the registers are tapped-off as illustrated, and multiplying and adding operations are carried out using the outputs from tap-coefficient generators 4550, 4552, 4554 and 4551, 4553, 4555, by means of multipliers 4510, 4511, 4512, 4513, 4514, 4515 and an adder 4560. In consequence, a transversal filter real part output is obtained as the output from the adder 4560. Similar multiplication and adding operations are made by means of multipliers 4516 to 4521 and the adder 4570, so that the transversal filter imaginary part output is obtained as the output from the adder 4570. Numerals 4561 and 4571 represent data discrimination circuits adapted to compare the input signal with a predetermined threshold value for each T seconds and to discriminate which one of the binary signals the input signal corresponds to. These data discrimination circuits 4561 and 4571 are adapted to deliver the real part data discrimination result and the imaginary part data discrimination result, respectively.

Adders 4562 and 4572 are adapted to determine the level differences between the actual input signals and the discrimination data or later-mentioned reference data signals delivered through the selectors 4563 and 4573, and produces this difference as a discrimination error signal which is delivered to the multipliers 4522 to 4527 and 4528 to 4533 for the correction of the present tap coefficient. The tap-coefficient generators 4550 and 4551 are used for the correction of the present tap coefficients in accordance with the result of computation by the multipliers 4522, 4529 and the adder 4540 and the result of computation by the multipliers 4523, 4528 and the adder 4541, respectively. Numerals 4542 to 4545 denote adders which are used for the correction of the tap coefficients similarly to the adders 4540 and 4541.

Figure 7:
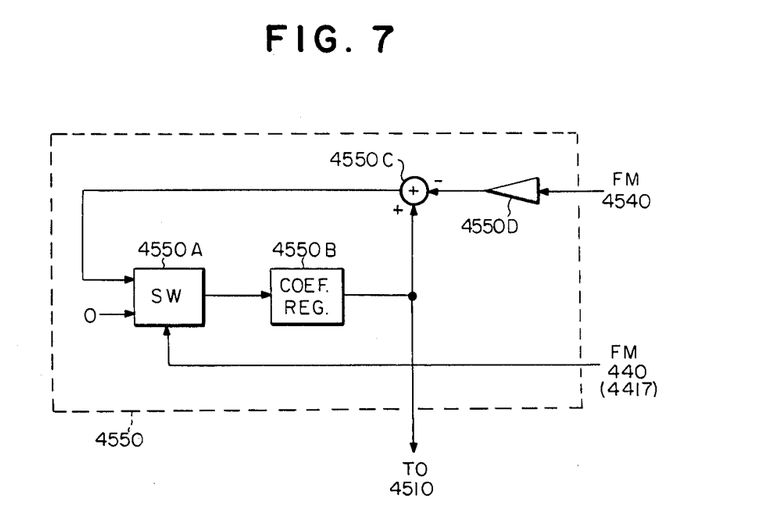
FIG. 7 is a block diagram of a tap-coefficient generator of an automatic equalizer as shown in FIG. 6.

FIG. 7 exemplarily shows the construction of the tap coefficient generator 4550. This generator 4550 is constituted, as is well known, by a kind of integrator having a correction gain setting section 4550D, an adder 4550C, a tap coefficient register 4550B and a selector 4550A. When the output signal $P_{12}$ of the level discriminator 4418 is "1" as a result of strong selective fading, the selector 4550A is switched so that the tapcoefficient register 4550B is reset to "0".

When there no selective fading is taking place, since a selector 4563 selects the output from the discriminator 4561, the automatic equalizer performs the operation as explained before in connection with FIG. 6. However, when there is selective fading to generate the $P_{11}$ signal of "1", the selector 4563 is changed-over to effect a correction of the tap coefficient by making use of later-mentioned reference data inputted to the selector. This way of correction is usually referred to as a "supervised-learning mode", the details of which are set forth in "A HIGHLY EFFICIENT HF MODEM WITH ADAPTIVE FADING CONTROL ALGORITHMS" by Botaro Hirosaki and Hidehito Aoyagi, GLOBECOM '84. A reference numeral 4573 designates a selection which performs the same kind of operation as the selector 4563.

The real part output and the imaginary part output obtained by using the thus adequately corrected tap coefficient are outputted alternatively at a period of T/2 in accordance with the switching signal $S_E$. In the example shown in FIG. 6, the output is delivered to the receiving even-number parity generating circuit 461.

Referring back to FIG. 4, the output signals from the odd-number channels and the even-number channels out of the first to eighth automatic equalizers are delivered to the receiving even-number parity generating circuits 461 and 462. The output signals from the second to seventh automatic equalizers 452 to 457 are inputted to the selectors 472 and 477.

Figure 8:
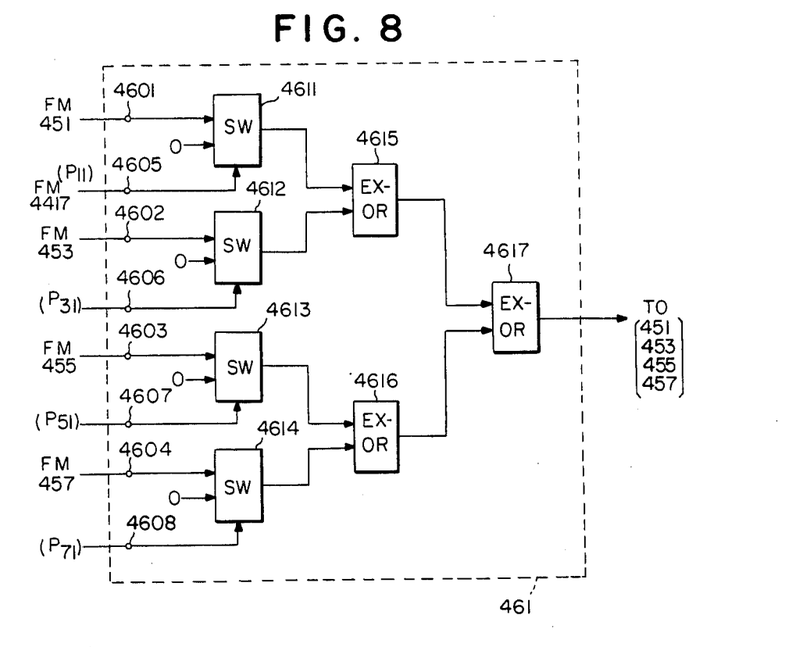
FIG. 8 is a block diagram of an even-number parity generating circuit for receiving in the system as shown in FIG. 4.

FIG. 8 shows the construction of the receiving even-number parity generating circuit 461. Another circuit 462 has a construction the same as this circuit 461. The circuit 461 has selectors 4611 to 4614 and exclusive OR circuits 4615 to 4617. As in the case of the transmission even-number parity generating circuits 107, 108, the parity generating circuits 461, 462 treats the +1 input or output signal as logical "1" and −1 input or output signal as logical "0". The input terminals 4601 to 4604 receive data outputted from the automatic equalizers 451, 453, 455 and 457, while the input terminals 4605 to 4608 receive the outputs $P_{k1}$ from the level discriminators, e.g., discriminator 4417, in the automatic-gain-control amplifying and level discriminating devices 441, 443, 445, 447, where k represents the channel number so that output from the discriminator 4417 is expressed by $P_{11}$. When the data from the input terminal 4605 is zero, i.e., under the condition of $P_{11}=0$, the selector 4601 selects and outputs the data from the input terminal 4601. To the contrary, when the data from the input terminal 4605 is "1", the "0" output is selected and outputted. Other selectors 4612 to 4614 operate in the same manner. Therefore, when the output $P_{k1}$ of the automatic-gain-control amplifying and level discriminating device of a certain channel is changed to "1", the receiving even-number parity generator connected to the automatic equalizer of this channel produces an even-number parity by making use of data received from another channel. This data corresponds to the correct data which was passed through the channel whose power was reduced due to selective fading.

In FIG. 4, the data outputted from the receiving even-number parity generating circuits 461 and 462 are delivered to the automatic equalizers of odd numbers and the automatic equalizers of even numbers, respectively, as the reference data explained before, and delivered also to the selectors 472 to 477 corresponding to the second to seventh automatic equalizers. The selectors 472 to 477 select the data outputted from the automatic equalizers when the output from the corresponding automatic-gain-control amplifying and level discriminating device of corresponding channels are "0". To the contrary, when the outputs $P_{k1}$ are "1", the selectors 472 to 477 select the data from the receiving even-number parity output circuit 461 or 462 and deliver them to the output terminals 482 to 487. Thus, even when the power of a certain channel has been reduced due to a selective fading to cause an error, the correct output is available always at the output terminal of the channel.

Although FIGS. 5 to 8 show the details of the structure of the blocks shown in FIG. 4 provided in the first channel, it will be understood that the same applies also to the blocks of other channels.

As will be understood from the foregoing description, the system of the invention offers the following advantages. When the power of a certain channel has been reduced below a predetermined first threshold level due to selective fading, an operation is made to correct the error and the corrected data is delivered as the reference data to the transversal filter type automatic equalizer connected to the channel suffering the power reduction, and a supervised-learning operation is made to correct the filter tap coefficient thereby holding the automatic equalizer in the stable state. When the selective fading is strengthened to further lower the power of the channel down to a level lower than a predetermined second threshold level so that the automatic equalizer cannot receive any effective input signal, the filter tap coefficients of the automatic equalizers are reset at zero. When the selective fading is weakened from this state so that the power of the channel recovers to a point higher than the above-mentioned second threshold level to enable the automatic equalizer to receive the effective input signal, the aforementioned supervised-learning operation is conducted to quickly bring the automatic equalizer to the stable state. It is thus possible to maintain the automatic equalizer in the desired stable state irrespective of the strength of the selective fading.

In the described embodiment, the filter coefficient of the automatic equalizer is set at zero when no effective input is available. The filter coefficient, however, may be set at another arbitrary value. As the automatic equalizer, a Decision Feedback Equalizer, which is known per se, can be used suitably.

Figure 9:
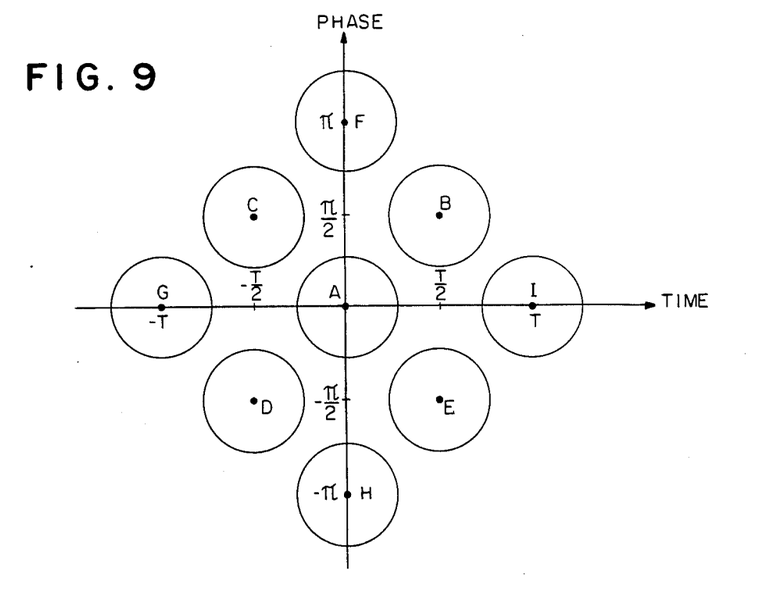
FIG. 9 is an illustration showing the concept of a stable point of operation of the automatic equalizer, for explaining of the effect of the invention.

FIG. 9 shows the points of stable state of the automatic equalizer as used in the embodiment described hereinbefore. Circles surrounding each point represent the region of convergence.

Assume here that the state of the automatic equalizer has converged to a point A for a suitable initial training. When the power is decreased in a certain channel, the input power to the automatic equalizer of the channel can be maintained constant by the operation of the automatic-gain-control amplifies, but the state of the automatic equalizer largely oscillates around the point A due to a deterioration in S/N of the input signal to the automatic equalizer in inverse proportion to the amplification gain. Then, as the selective fading is further strengthened, the state of the automatic equalizer comes out of the region of convergence around the point A to drop into the region of convergence around another point or unstably fluctuates without dropping into the region of convergence of any one of the points of stable state. The correct data cannot be received at all because the correct time relation between the output data of the parallel channel is lost, when the state of operation has dropped onto another point of stability, e.g., one of the points B to E, which have certain time differences from the point A, not to mention to the case where the state of operation of the equalizer fluctuates. The receipt of correct data fails also when the state of operation has dropped onto one of the other points of stability, e.g., point F or H, having no time difference from the point A, unless differential coding is conducted. According to the invention, when the power of a certain channel has fallen below a predetermined first threshold level, the resulting error is corrected by using the even-number parity, and the associated automatic equalizer is controlled to perform the supervised-learning operation making use of the receiving even-number parity generating circuit. As a result of this operation, the state of the automatic equalizer is controlled such that its state is urged towards the point A so that the state of operation of this equalizer does not drop into the other states although it may slightly fluctuate around the point A.

Furthermore, when the selective fading is strengthened to such an extent that the input signal to the automatic equalizer is composed mostly of noise, the correction of the tap coefficient is continued with a certain offset unless the noise is perfectly white. Therefore, the tap coefficient exhibits an extremely large absolute value to prevent the operation state of the automatic equalizer from being reset to the desired point of stable state, when the effective signal has been recovered due to a weakening of the selective fading. In order to obviate this problem, according to the invention, all of the filter tap coefficients of the automatic equalizer are reset to zero, and the control for realizing the aforementioned supervised learning control is commenced when the power of the channel has become greater than the second threshold level as a result of the weakening of the selective fading. Consequently, the state of the automatic equalizer is converged to the point A of stable state without delay.

What is claimed is:

1. A selective fading protection system for protecting against fading selectively occurring in a specific channel of a parallel data transmission system, said system comprising:
   a plurality of data channels;
   an equalizer provided in each channel and adapted for equalizing received data;
   an error correcting means for correcting errors of said received data in at least any one channel;
   a comparator associated with each channel and adapted to deliver a first signal when the level of said received data in the associated channel has been reduced below a predetermined first threshold level to indicate a level reduced channel; and
   a controller adapted to operate in response to said first signal so as to deliver, as reference data, the correct data, after correction by said error correcting means, to the equalizer provided in the level reduced channel, and to effect a supervised-learning operation for correcting a coefficient of said equalizer in the level reduced channel so as to reduce the difference between said reference data and the output from said equalizer in said level reduced channel.

2. A selective fading protection system according to claim 1, wherein said parallel data transmission system is an orthogonally multiplexed parallel data transmission system.

3. A selective fading protection system according to claim 1, wherein said equalizer has a transversal filter.

4. A selective fading protection system according to claim 1, wherein said error correction is conducted based on an even-number parity method.

5. A selective fading protection system for protecting against fading selectively occurring in a specific channel of a parallel data transmission system, said system comprising:

a plurality of data channels;

an equalizer provided in each channel and adapted for equalizing received data, each equalizer having a plurality of coefficients;

an error correcting means for correcting errors of received data in at least any one channel;

a comparator associated with each channel and adapted to deliver a signal when the level of said received data in the associated channel has been reduced below a predetermined threshold level to indicate a reduced level channel; and a controller adapted to operate in response to said signal so as to set all coefficients of said equalizer in said reduced level channel at predetermined values.

6. A selective fading protection system according to claim 5, wherein said predetermined values are zero.

7. A selective fading protection system according to claim 5, wherein said parallel data transmission system is an orthogonally multiplexed parallel data transmission system.

8. A selective fading protection system according to claim 5, wherein said equalizer has a transversal filter.

9. A selective fading protection system according to claim 5, wherein said error correction is conducted based on an even-number parity method.

10. A selective fading protection system for protecting against fading selectively occurring in a specific channel of a parallel data transmission system, said system comprising:

a plurality of data channels;

an equalizer provided in each channel and adapted for equalizing the received data;

an error correcting means for correcting errors of received data in at least any one channel;

a comparator associated with each channel and adapted to deliver a first signal when the level of said received data in the associated channel has been reduced below a predetermined first threshold level but is higher than a second threshold level; and a controller adapted to operate in response to said first signal so as to deliver, as reference data, correct data after correction by ssid error correcting means to the equalizer of the level reduced channel, and to effect a supervised-learning operation for correcting a coefficient of said equalizer of said level reduced channel so as to reduce the difference between said reference data and the output from said equalizer of said level reduced channel.

11. A selective fading protection system according to claim 10, wherein said parallel data transmission system is an orthogonally multiplexed parallel data transmission system.

12. A selective fading protection system according to claim 10, wherein said equalizer has a transversal filter.

13. A selective fading protection system according to claim 10, wherein the error correction is conducted based on an even-number parity method.

14. A selective fading protection system for protecting against fading selectively occurring in a specific channel of a parallel data transmission system, said system comprising:

an equalizer provided in each channel and adapted for equalizing the received data;

an error correcting means for correcting errors of received data in at least any one channel;

a comparator associated with each channel and adapted to deliver a first signal when the level of said received data in the associated channel has been reduced below a predetermined first threshold level but is above a predetermined second threshold level to indicate a level reduced channel, and to produce a second signal when the received data is below said second threshold level to indicate a severely level reduced channel; and a controller adapted to operate in response to said first signal so as to deliver, as reference data, correct data, after correction by said error correcting means, to the equalizer of said level reduced channel, and to effect a supervised-learning operation for correcting a coefficient of said equalizer of said level reduced channel so as to reduce the difference between said reference data and the output from said equalizer of said level reduced channel, said controller being further adapted to set all coefficients of said equalizer of said severely level reduced channel at predetermined values in response to said second signal, and to effect said supervised-learning operation when the outputting of said second signal is stopped while said first signal still exists.

15. A selective fading protection system according to claim 14, wherein said parallel data transmission system is an orthogonally multiplexed parallel data transmission system.

16. A selective fading protection system according to claim 14, wherein said equalizer has a transversal filter.

17. A selective fading protection system according to claim 14, wherein said error correction is conducted based on an even-number parity method.

18. A selective fading protection system according to claim 14, wherein said predetermined values are zero.

* * * * *